United States Patent
Mahapatra

(10) Patent No.: US 10,545,840 B1
(45) Date of Patent: Jan. 28, 2020

(54) CRASH TOLERANT COMPUTER SYSTEM

(71) Applicant: AMAZON TECHNOLOGIES, INC., Seattle, WA (US)

(72) Inventor: Abinash Mahapatra, Cupertino, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 125 days.

(21) Appl. No.: 15/660,714

(22) Filed: Jul. 26, 2017

(51) Int. Cl.
| | |
|---|---|
| G06F 11/00 | (2006.01) |
| G06F 11/16 | (2006.01) |
| G06F 11/20 | (2006.01) |
| G06F 11/14 | (2006.01) |
| G06F 11/36 | (2006.01) |
| G06F 11/07 | (2006.01) |

(52) U.S. Cl.
CPC ...... *G06F 11/1637* (2013.01); *G06F 11/0724* (2013.01); *G06F 11/1479* (2013.01);
(Continued)

(58) Field of Classification Search
CPC ............... G06F 11/1637; G06F 11/165; G06F 11/1662; G06F 11/2038; G06F 11/20; G06F 11/2097; G06F 11/004; G06F 11/006; G06F 11/07; G06F 11/0703; G06F 11/0715; G06F 11/0718; G06F 11/0721; G06F 11/0724; G06F 11/0751; G06F 11/0778; G06F 11/0781; G06F 11/079; G06F 11/0793; G06F 11/14; G06F 11/1641; G06F 11/202; G06F 11/2041; G06F 11/36; G06F 11/3604; G06F 11/3612; G06F 11/362; G06F 11/3624; G06F 11/3636; G06F 11/3644; G06F 11/3648; G06F 11/366; G06F 11/3664; G06F 11/3668;
(Continued)

(56) References Cited

U.S. PATENT DOCUMENTS

| | | | | | |
|---|---|---|---|---|---|
| 4,819,232 | A | * | 4/1989 | Krings | G06F 11/2028 714/13 |
| 6,029,258 | A | * | 2/2000 | Ahmad | G06F 11/366 714/26 |

(Continued)

OTHER PUBLICATIONS

Y. Wang, Y. Huang and W. K. Fuchs, "Progressive retry for software error recovery in distributed systems," FTCS-23 the Twenty-Third International Symposium on Fault-Tolerant Computing, Toulouse, France, 1993, pp. 138-144. (Year: 1993).*

*Primary Examiner* — Anthony J Amoroso
(74) *Attorney, Agent, or Firm* — Lindauer Law, PLLC

(57) ABSTRACT

A computing device has access to a normal code execution environment and a suspect code execution environment. Suspect code data indicative of code that has been determined to be likely to cause a crash is accessed. Program code is executed using the normal code execution environment until suspect code as indicated in the suspect code data is encountered. Execution of suspect code takes place within the suspect code execution environment where a failure, if any, is contained. If the suspect code executing within the suspect code execution environment completes without failure, the resulting execution context is transferred to the normal code execution environment for continued processing. Otherwise, the suspect code is skipped and processing continues in the normal code execution environment. The code execution environments may be different cores of the same processor, different processors, or different devices.

20 Claims, 4 Drawing Sheets

(52) U.S. Cl.
CPC ........ *G06F 11/165* (2013.01); *G06F 11/1662* (2013.01); *G06F 11/2038* (2013.01); *G06F 11/3664* (2013.01); *G05B 2219/14139* (2013.01); *G05B 2219/33315* (2013.01); *G05B 2219/33316* (2013.01); *G06F 11/20* (2013.01); *G06F 11/2097* (2013.01)

(58) Field of Classification Search
CPC .. G06F 11/3692; G06F 11/3696; G06F 8/656; G06F 8/72; G06F 8/75; G06F 9/3861; G06F 9/44589; G06F 11/1479; G05B 2219/14139; G05B 2219/33315; G05B 2219/33316
USPC ....... 714/25, 30, 31, 33, 35, 37, 38.1, 38.14, 714/39, 47.1, 47.2, 48, 49
See application file for complete search history.

(56) References Cited

U.S. PATENT DOCUMENTS

| | | | | |
|---|---|---|---|---|
| 6,170,065 B1* | 1/2001 | Kobata | ............... | G06F 11/0709 714/38.14 |
| 6,745,321 B1* | 6/2004 | Floyd | ................... | G06F 9/3836 710/267 |
| 6,757,837 B1* | 6/2004 | Platt | ................... | G06F 11/0748 714/38.13 |
| 6,763,517 B2* | 7/2004 | Hines | ....................... | G06F 8/66 714/48 |
| 9,965,376 B1* | 5/2018 | Mola | .................... | G06F 11/3664 |
| 2005/0262472 A1* | 11/2005 | Wood | .................... | G06Q 10/06 717/102 |
| 2007/0294584 A1* | 12/2007 | Jain | ....................... | G06F 11/004 714/37 |
| 2011/0231709 A1* | 9/2011 | Bellocchio | .............. | G06F 21/55 714/38.1 |
| 2012/0023311 A1* | 1/2012 | Yamamoto | ........... | G06F 9/3851 712/205 |
| 2012/0144383 A1* | 6/2012 | Mishra | ................ | G06F 11/1433 717/173 |
| 2014/0089731 A1* | 3/2014 | Lee | ..................... | G06F 11/2028 714/10 |
| 2015/0212905 A1* | 7/2015 | Gschwind | ........... | G06F 11/1474 714/42 |
| 2015/0242246 A1* | 8/2015 | Gschwind | ............... | G06F 9/522 714/47.2 |

* cited by examiner

CRASH TOLERANT COMPUTER SYSTEM

BACKGROUND

A wide variety of computing devices are used every day, executing computer code that instructs them to perform functions ranging from operating an implanted pacemaker to driving an autonomous car or running an app on a smartphone. Sometimes portions of code may result in a failure or crash. A crash may result in consequences that are undesirable.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
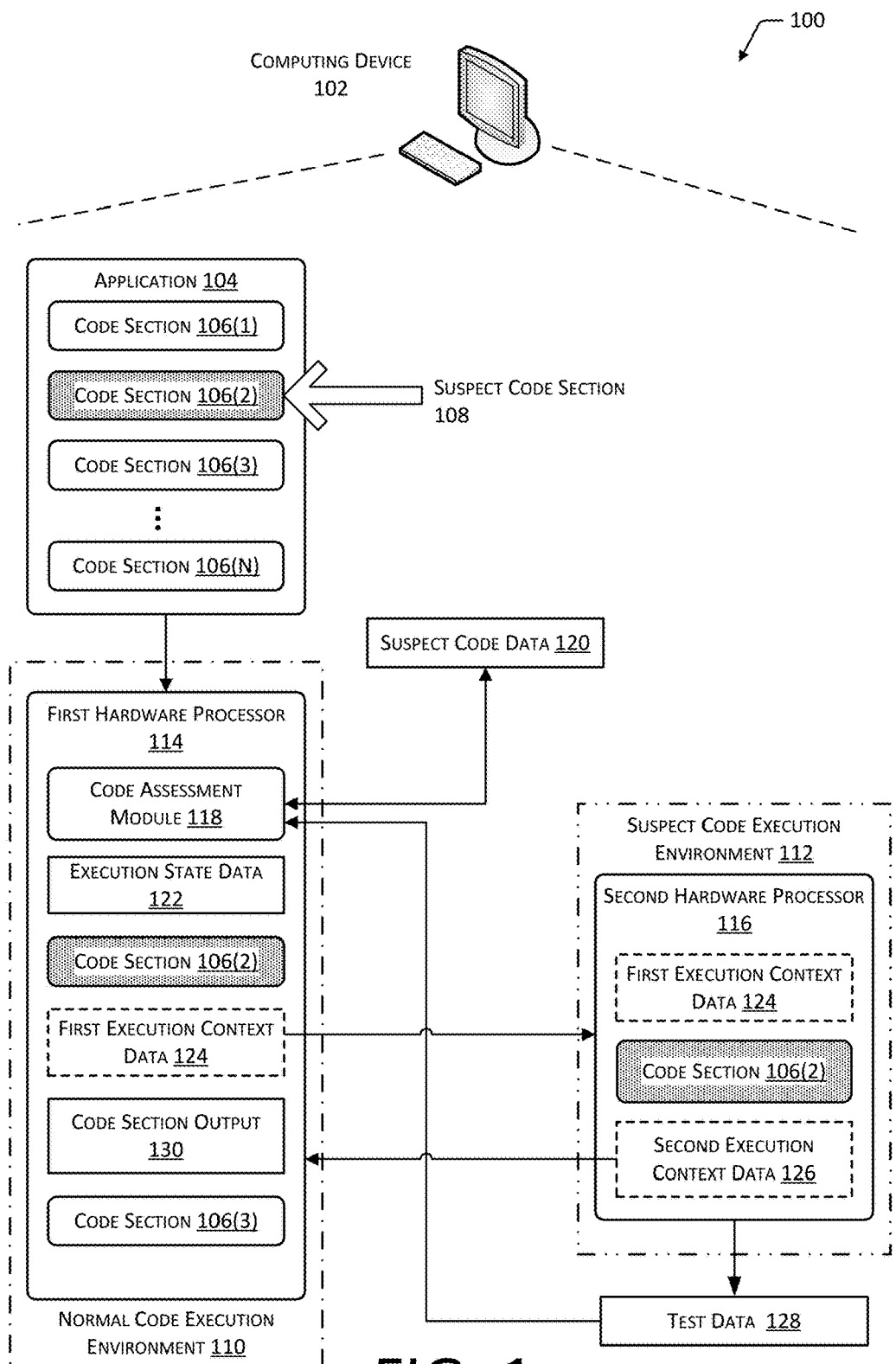
FIG. 1 illustrates a system having a crash tolerant computing device, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A wide variety of computing devices execute application code (or "code") using hardware processors. These computing devices may include implanted devices, internet-connected devices, smart phones, vehicles, tablet computers, personal computers, and more. Sometimes a failure may be encountered during execution of code. For example, the failure may comprise a crash during which proper execution of the code ceases. Failures may occur because of invalid instructions within the code, incorrect address values, buffer overflows, incorrectly overwriting one portion of code with another, unhandled exceptions, and so forth. The source of the failure within an application comprising various sections of code may be known as a "bug". As the complexity of applications increases, the likelihood that a program contains a bug also increases. Additionally, many applications are subject to a rapid development schedule which means that new versions or features may be implemented within relatively short time periods.

A variety of systems collect information about application failures. For example, when an application crashes, information about that crash may be reported to a crash analytics system. This system may compile information about crashes. Traditionally, the information obtained by such a crash analytics system would be used to identify bugs that may then be fixed, with those fixes incorporated into a future version or patch of the application. As a result, the crash analytics systems provide information after a crash has already occurred.

Depending on the function of the computing device, the consequences of a crash may range from being inconvenient to being catastrophic. It is therefore desirable to eliminate or mitigate the consequences of the crash during execution of code by a hardware processor.

Described in this disclosure are techniques and systems that are used to provide a crash tolerant computer system. An application may comprise a plurality of code sections. For example, a code section may comprise a few lines of code or may include a software module with many thousands of lines. During normal execution, these code sections are executed by one or more hardware processors. However, as described above, some code sections may include errors that could result in a crash or other failure when executed.

A computing device may access suspect code data. The suspect code data may be produced by a crash analytics system, bug tracking system, and so forth. The suspect code data comprises information that is indicative of at least a portion of a code section, or information associated with execution of that code section, that has been deemed to be suspect. For example, a particular code section that is associated with more than a threshold number of crashes as reported to the crash analytics system may be deemed to be a suspect code section.

The computing device includes or has access to two code execution environments. Each code execution environment is configured to execute at least a portion of the code associated with the application. For example, each code execution environment may comprise a particular hardware processor that is dedicated to use by that code execution environment. Continuing the example, each code execution environment may have other resources, such as memory, that are dedicated or otherwise allocated to that particular environment. In a first implementation, each code execution environment may comprise a particular processing core on a common substrate of a hardware processor. In a second implementation, each code execution environment may be executed using separate hardware processors. The separate hardware processors may be of the same or different type or architectures. For example, a first hardware processor with a first architecture may be manufactured by a first manufacturer while a second hardware processor with a second architecture may be manufactured by a second manufacturer.

Of the two code execution environments, a normal (or first) code execution environment is used to execute code sections that are not deemed to be suspect as indicated by the suspect code data. A suspect (or second) code execution environment is used to execute those code sections that are deemed to be suspect as indicated by the suspect code data.

During operation, a code assessment module may execute within the normal code execution environment. The code assessment module may compare execution state data such as stack values, register values, and so forth to information stored in the suspect code data. If the code assessment module determines that code that is about to be executed matches or otherwise corresponds to suspect code as indicated by the suspect code data, execution of that suspect code section is paused. The suspect code section is then transferred to the suspect code execution environment. This transfer may include moving first execution context data, such as register values, program counter values, and so forth from the normal code execution environment to the suspect code execution environment. Once transferred to the suspect code execution environment, the suspect code section is executed. If the execution of the suspect code section proceeds without failure, then second execution context data indicative of the results of the execution of the suspect code section may be transferred back to the normal code execution environment for continued processing. If the execution of the suspect code section does fail, such as resulting in a crash within the suspect code execution environment, then the execution of the suspect code section may be skipped by the normal code execution environment and subsequent code sections may then be executed. In this way, the failure of a particular code section may not result in a catastrophic failure of the entire application.

Test data may be generated that provides information about the execution of the suspect code section within the suspect code execution environment. For example, the test data may indicate that the suspect code section did not fail, or may provide trace information associated with an indication of failure.

In some implementations, the suspect code data may be generated locally by the computing device. For example, the computing device may run a crash reporting service that generates the suspect code data after a particular code section results in a crash. During subsequent execution of the application, that particular code section may be deemed to be a suspect code section, and thus may be executed within the suspect code execution environment.

The normal code execution environment and the suspect code execution environment may both be physically located within the same computing device, or may be distributed across two or more computing devices. For example, the normal code execution environment may execute on the computing device while the suspect code execution environment is executed on a server or other computing device that is accessible via a network.

In some implementations, patch data may be acquired to repair a particular code section. For example, patch data may be transmitted to the computing device and may be executed in place of the suspect code section. In this way, updates to an application may be delivered, tested, and utilized in an extremely granular fashion. In another example, the patch data may be used to overwrite a particular code section that has been deemed to be suspect. During subsequent execution, the particular code section that has been updated by the patch data may be executed within the normal code execution environment.

By using the techniques and systems described in this disclosure, overall operation of the computing device is improved. For example, by limiting the crash of an application to the suspect code execution environment may prevent the normal code execution environment from the consequences of such a crash, such as application freezes, catastrophic failure of all software being executed by the normal code execution environment, and so forth. As a result, fewer computing resources are utilized. For example, by preventing a crash from becoming a catastrophic event, the consequences of such a crash such as writing a crash dump to memory, restarting the computing device, and so forth, are avoided.

The techniques and systems described in this disclosure may also improve the user experience. For example, by constraining the execution of the suspect code section to the suspect code execution environment, any resulting crash is limited in scope and may not otherwise result in the complete failure of the application.

Illustrative System

FIG. 1 illustrates a system 100 having a crash tolerant computing device 102, according to some implementations. The computing device 102 may include, but is not necessarily limited to, implanted devices, internet-connected devices, smart phones, vehicles, tablet computers, personal computers, embedded devices, appliances, servers, and so forth.

The computing device 102 has an application 104 for execution. The application 104 may provide one or more functions such as input acquisition, presentation of output, data processing, and so forth. The application 104 may include a plurality of code sections 106(1), 106(2), 106(3), ..., 106(N). In some implementations, a code section 106 may comprise a few lines of code, while in others it may comprise a software module with many thousands of lines. In still other implementations, a code section 106 may be delineated by breakpoints or other indicia that are present within the code.

Some code sections 106 may be designated as suspect code sections 108. A suspect code section 108 may comprise one or more instructions that have been determined to have a failure rate when executed that is above a threshold value.

The computing device 102 includes a normal code execution environment 110 and a suspect code execution environment 112. The normal code execution environment 110 may include a first hardware processor 114, while the suspect code execution environment 112 includes a second hardware processor 116. The first hardware processor 114 and the second hardware processor 116 may be one or more of different cores on a common substrate, may be separate hardware processors on separate substrates, and so forth. The first hardware processor 114 and the second hardware processor 116 may either have the same or different architectures, manufacturers, capabilities, and so forth. For example, the first hardware processor 114 may comprise a processor that utilizes an architecture designed by Intel while the second hardware processor 116 may comprise a processor that utilizes an architecture designed at least in part by ARM Holdings. In another example, the first hardware processor 114 and the second hardware processor 116 may operate at different clock speeds, support different address space schemes, handle different bit lengths, and so forth.

For ease of illustration, and not necessarily as a limitation, the normal code execution environment 110 and the suspect code execution environment 112 are depicted as including a single processor. It is understood, that in other implementations, each code execution environment may include one or more processors, processing elements such as cores, and so forth. For example, the first hardware processor 114 may have eight cores while the second hardware processor 116 is a single core device.

A code assessment module 118 may be executed within the normal code execution environment 110. The code assessment module 118 may access the suspect code data 120. The suspect code data 120 comprises information indicative of code sections 106 or portions thereof that have been deemed to be likely to cause a failure during execution. For example, the suspect code data 120 may be generated by a crash analytics system that obtains information from a plurality of computing devices 102. In the event of a crash on one of these computing devices 102, information associated with the crash such as a stack backtrace, stack trace, register values, program counter values, and so forth may be returned to the crash analytics system. For example, the stack backtrace may comprise information that is indicative of stack frames associated with prior execution of the suspect code section 108 that resulted in a failure. The crash analytics system may then be used to generate suspect code data 120. For example, the suspect code data 120 may comprise the top 50 code sections as measured by number of crashes that are associated with the application 104.

During operation, the code assessment module 118 may access execution state data 122. The execution state data 122 comprises information associated with the current portion of the application 104 being executed within the normal code execution environment 110. For example, the execution state data 122 may include one or more of stack values, register values, program code values, and so forth. The code assessment module 118 determines if there is a correspondence between at least a portion of the execution state data 122 and the suspect code data 120. For example, if there is a match between values of the stack trace in the execution state data 122 and a backtrace in the suspect code data 120, then the code section 106 that is about to be executed, or that has begun execution, may be deemed to be a suspect code section 108.

In this illustration, the code section 106(2) is deemed to be a suspect code section 108, as indicated by shading. First execution context data 124 associated with the suspect code section 108, that of code section 106(2) in this example, is acquired and transferred to the suspect code execution environment 112. The first execution context data 124 comprises information associated with execution of the suspect code section 108. For example, the first execution context data 124 may comprise register values, program counter values, and so forth. In some implementations, the transfer of the suspect code section 108 and its associated context from the normal code execution environment 110 to the suspect code execution environment 112 may be accomplished using a mechanism similar to those used for context switching between threads or processes executing on a hardware processor.

Within the suspect code execution environment 112, the first execution context data 124 is used to instantiate and carry on the execution of the suspect code section 108, in this example the code section 106(2). If the suspect code section 108 completes its execution without error, the subsequent second execution context data 126 that is associated with the completion of that code section 106 or portion thereof may then be transferred back to the normal code execution environment 110. In the event of failure, test data 128 may be generated by the suspect code execution environment 112. Failure handling and the test data 128 is discussed in more detail in the following figures.

Returning to the normal code execution environment 110, the second execution context data 126 may be used by subsequent code sections 106 during their execution. For example, the second execution context data 126 may include code section output 130 that comprises one or more values that have been determined by the operation of the suspect code section 108. The code section output 130 may then be used as input to subsequent code sections, such as the code section 106(3).

In some implementations, the suspect code execution environment 112 may be external to the computing device 102. For example, the normal code execution environment 110 may execute on the computing device 102 while the suspect code execution environment 112 is executed on a server or other computing device that is accessible via a network. Continuing this example, the first execution context data 124 may be sent via a network interface connected to a network such as the Internet to a server at another location. The server may then provide the suspect code execution environment 112. The data returned by the suspect code execution environment 112 such as the second execution context data 126, test data 128, and so forth may then be returned via the network to the computing device 102.

Figure 2:
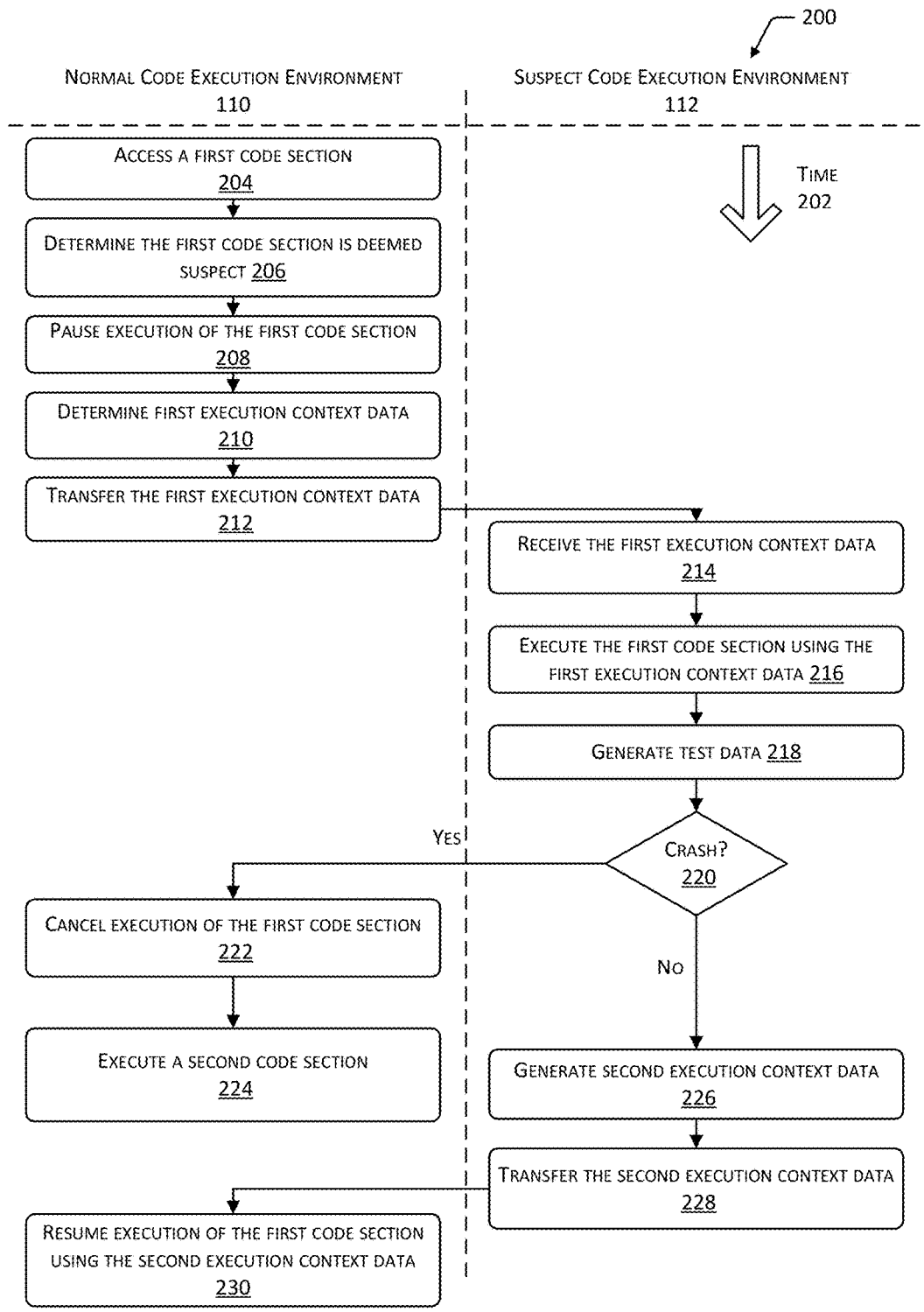
FIG. 2 is a flow diagram of a process of providing crash tolerant execution on a computing device, according to some implementations.

FIG. 2 is a flow diagram 200 of a process of providing crash tolerant execution on a computing device 102, according to some implementations. In this illustration, operations being performed by the normal code execution environment 110 are arranged on the left side while those operations being performed by the suspect code execution environment 112 are arranged on the right side. For example, operations 204-212, 222, and 224 are performed by the normal code execution environment 110. Continuing the example, operations 214-220, 226, and 228 are performed by the suspect code execution environment 112. In this illustration, time 202 generally increases from top to bottom, such that operations presented at the top of the page may occur before those operations presented at the bottom of the page.

At 204, a first code section 106 is accessed. For example, the code section 106(2) maybe loaded into or accessed by the normal code execution environment 110.

At 206, the first code section 106 is determined to be suspect. For example, at least a portion of the execution state data 122 associated with the code section 106(2) may be compared to the suspect code data 120. Continuing the example, there may be a match between a register value as indicated by the execution state data 122 and a register value in the suspect code data 120. In other implementations, the matches may be made using hashes of one or more values. For example, one or more of the register values of the execution state data 122 may be hashed, and the resulting hash value may be compared to hash value stored within the suspect code data 120. Other data that may be hashed may include stack trace values, program counters, and so forth.

In one implementation, the determination that the first code section 106 is deemed to be suspect may include one or more of the following operations. The suspect code data 120 comprising one or more previously stored stack backtraces that are indicative of stack frames associated with prior execution of suspect code sections 108 is accessed. For example, the suspect code data 120 may be retrieved from a data store. The execution state data 122 indicative of one or more active stack frames associated with operation of the first hardware processor 114 that is processing the first code section 106 may be determined. The execution state data 122 may be compared to the suspect code data 120. A match between the suspect code data 120 and the execution state data 122 may be determined. In some implementations, the match may comprise an exact match, while in other implementations a correspondence that is within a threshold value may be deemed to be a match.

At 208, execution of the first code section 106 within the normal code execution environment 110 may be paused.

At 210, the first execution context data 124 associated with the first code section 106 is determined. For example, the first execution context data 124 may comprise information indicative of a state of the first hardware processor 114 with respect to the first code section 106. Continuing the example, the first execution context data 124 may comprise register values, program counter values, and so forth.

At 212 the first execution context data 124 is transferred to the suspect code execution environment 112. In some implementations, the transfer may utilize commands such as those associated with context switching on a hardware processor. For example, this may utilize commands that store the execution context and transfer the execution context to the other execution environment. These commands may instruct the storing and transfer of state data such as all the registers used by the first code section 106, program counter value, data stored within a process control block or switchframe, and so forth.

At 214, the first execution context data 124 is received by the suspect code execution environment 112. For example, the suspect code execution environment 112 may load the values from the first execution context data 124 into the appropriate registers, counters, and so forth within the suspect code execution environment 112.

At 216, the first code section 106 is executed using the first execution context data 124. For example, the second hardware processor 116 may perform one or more of the instructions specified by the first code section 106.

At 218, test data 128 is generated. For example, the test data 128 may indicate that a crash occurred, may provide information such as backtrace values associated with the crash, and so forth. Continuing the example, the test data 128 may include crash dump data. In another example, the test data 128 may indicate successful completion of the first code section 106 without error. Continuing the example, the test data 128 may indicate information such as the first execution context data 124 and data indicative of a successful completion thereof.

In the implementation depicted here, at 220 the test data 128 may be assessed to determine if a crash or other failure occurred. If a crash is determined to occur, the process may proceed to 222. If no crash is determined to occur, the process may instead proceed to 226.

The determination of whether a failure such as a crash has occurred or not may be made by assessing the test data 128. For example, the test data 128 may include information obtained from a watchdog process that determines whether the program counter associated with the execution of the first code section 106 has incremented within a given period of time.

The test data 128 may be provided to the code assessment module 118 or another module executing within the normal code execution environment 110.

Responsive to the determination that a crash has occurred, at 222 execution of the first code section 106 is canceled. The process may then proceed to 224.

At 224, a second code section 106 is executed. For example, the second code section 106 designed for execution by a previous code section 106 may be executed by the first hardware processor 114.

Returning to 220, if no crash is determined, the process may proceed to 226.

At 226, the second execution context data 126 is generated. The second execution context data 126 may comprise the context data associated with the completion of the suspect code section 108.

At 228, the second execution context data 126 is transferred to the normal code execution environment 110.

At 230, execution of the first code section 106 resumes, using the second execution context data 126. For example, the normal code execution environment 110 may receive and then load the values from the second execution context data 126 into the appropriate registers, counters, and so forth within the normal code execution environment 110. In another implementation, the second code section 106 may begin execution using the values of the second execution context data 126. For example, the first code section 106 may complete execution within the suspect code execution environment 112, and one or more of the second execution context data 126 or the resulting code section output 130 may be transferred to the normal code execution environment 110 for subsequent use.

In some implementations, the test data 128 may be provided to the code assessment module 118 or another device or module. The test data 128 may be used to adjust future operation of the code assessment module 118. For example, a particular suspect code section 108 indicated in the suspect code data 120 may be deprecated and removed from the suspect code data 120 after a threshold number of successful executions that did not result in a crash. This allows the system to be dynamic in dealing with crashes that may be the result of interactions with other applications 104 executing or hardware installed on the computing device 102.

Figure 3:
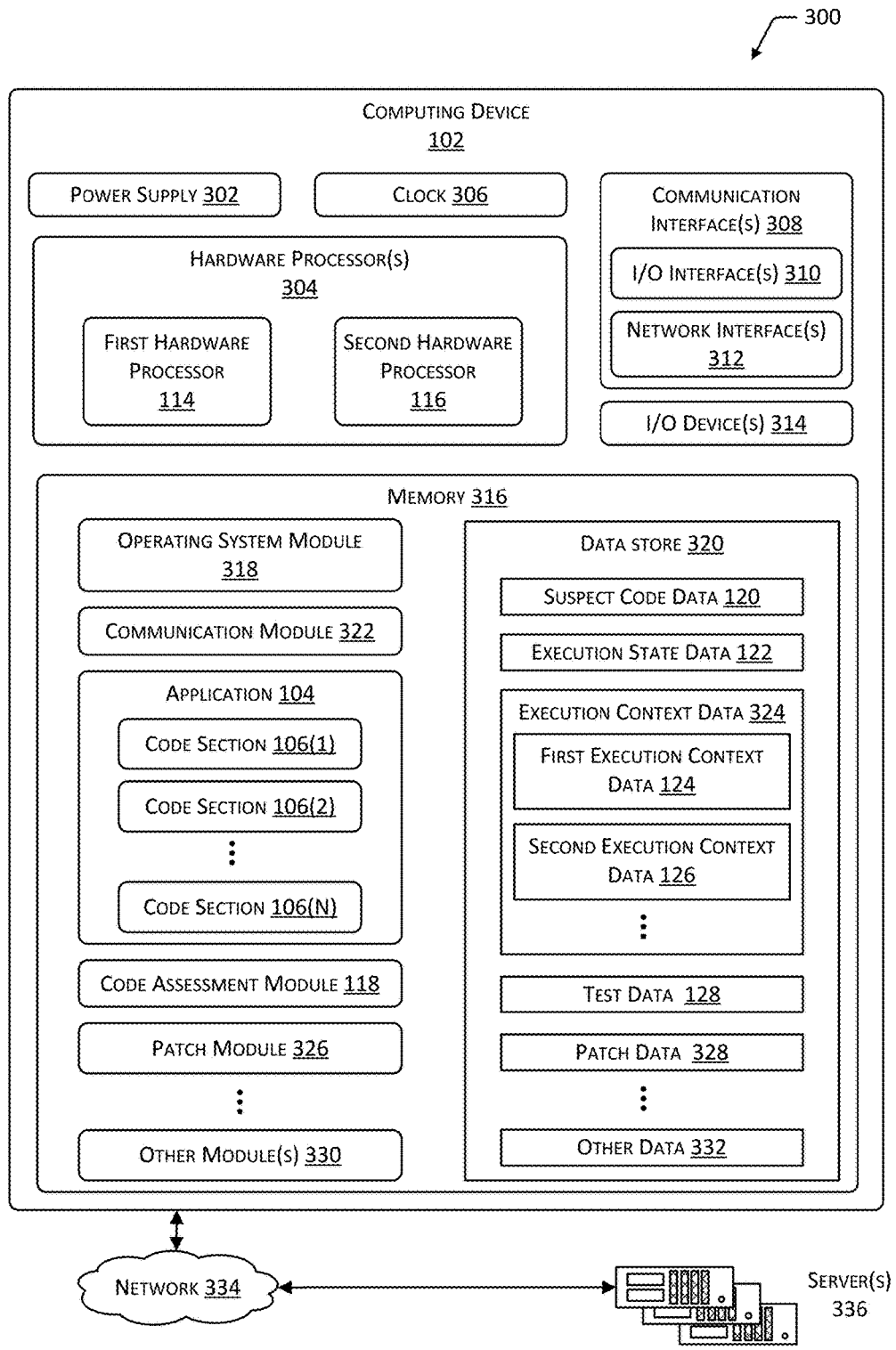
FIG. 3 is a block diagram of a computing device that implements the crash tolerant process described, according to some implementations.

FIG. 3 is a block diagram 300 of the computing device 102 that implements at least a portion of the crash tolerant process described, according to some implementations.

The computing device 102 may include one or more of the following components. One or more power supplies 302 may be configured to provide electrical power suitable for operating the components in the computing device 102. The one or more power supplies 302 may comprise batteries, capacitors, fuel cells, photovoltaic cells, wireless power receivers, conductive couplings suitable for attachment to an external power source such as provided by an electric utility, and so forth.

The computing device 102 may include one or more hardware processors 304 (processors) configured to execute one or more stored instructions. For example, the processors may include the first hardware processor 114 and the second hardware processor 116. The processors 304 may comprise one or more cores. The processors 304 may be of the same or different types or architectures. One or more clocks 306 may provide information indicative of date, time, ticks, and so forth. For example, the processor 304 may use data from the clock 306 to associate a particular interaction with a particular point in time.

The computing device 102 may include one or more communication interfaces 308 such as input/output (I/O) interfaces 310, network interfaces 312, and so forth. The communication interfaces 308 enable the computing device 102, or components thereof, to communicate with other devices or components. The communication interfaces 308 may include one or more I/O interfaces 310. The I/O interfaces 310 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include input devices such as one or more of a sensor, keyboard, mouse, scanner, and so forth. The I/O devices 314 may also include output devices such as one or more of a display device, printer, audio speakers, and so forth. In some embodiments, the I/O devices 314 may be physically incorporated with the computing device 102 or may be externally placed.

The network interfaces 312 may be configured to provide communications between the computing device 102 and other devices, such as routers, access points, and so forth. The network interfaces 312 may include devices configured to couple to personal area networks (PANs), local area networks (LANs), wireless local area networks (WLANS), wide area networks (WANs), and so forth. For example, the network interfaces 312 may include devices compatible with Ethernet, Wi-Fi, Bluetooth, ZigBee, and so forth.

The computing device 102 may also include one or more busses or other internal communications hardware or software that allow for the transfer of data between the various modules and components of the computing device 102.

As shown in FIG. 3, the computing device 102 includes one or more memories 316. The memory 316 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 316 provides storage of computer-readable instructions, data structures, program modules, and other data for the operation of the computing device 102. A few example functional modules are shown stored in the memory 316, although the same functionality may alternatively be implemented in hardware, firmware, or as a system on a chip (SoC).

The memory 316 may include at least one operating system (OS) module 318. The OS module 318 is configured to manage hardware resource devices such as the I/O interfaces 310, the I/O devices 314, the communication interfaces 308, and provide various services to applications or modules executing on the processors 304. The OS module 318 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 316 may be a data store 320 and one or more of the following modules. These modules may be executed as foreground applications, background tasks, daemons, and so forth. The data store 320 may use a flat file, database, linked list, tree, executable code, script, or other data structure to store information. In some implementations, the data store 320 or a portion of the data store 320 may be distributed across one or more other devices including servers, network attached storage devices, and so forth.

A communication module 322 may be configured to establish communications with external devices such as other computing devices 102. The communications may be authenticated, encrypted, and so forth.

The application 104 module, and the associated code sections 106 may be stored within the memory 316.

The code assessment module 118 may also be stored within the memory 316. As described above, the code assessment module 118 may access information stored in the data store 320, such as suspect code data 120, execution state data 122, execution context data 324 such as the first execution context data 124 and the second execution context data 126, the test data 128, and so forth.

In some implementations, a patch module 326 may be stored in the memory 316 and executed by one or more of the hardware processors 304. The patch module 326 may be configured to use patch data 328 to update at least a portion of one or more code sections 106. Operation of the patch module 326 is discussed in more detail below with regard to FIG. 4.

Other modules 330 may be stored in the memory 316 as well as other data 332. For example, the other modules 330 may include a crash analytics module that gathers data associated with failures of the application 104 or portions thereof as executing on the computing device 102.

The computing device 102 may utilize one or more of the communication interfaces 308 to access the network 334. For example, the network 334 may comprise a local area network, wide area network, and so forth. The network 334 may enable communication with one or more external devices such as one or more servers 336. In some implementations, the servers 336 may provide services such as crash analytics gathering, generation and distribution of the suspect code data 120 to the computing device 102, and so forth. For example, the computing device 102 may receive the suspect code data 120 from one or more of the servers 336 via an Internet connection.

Figure 4:
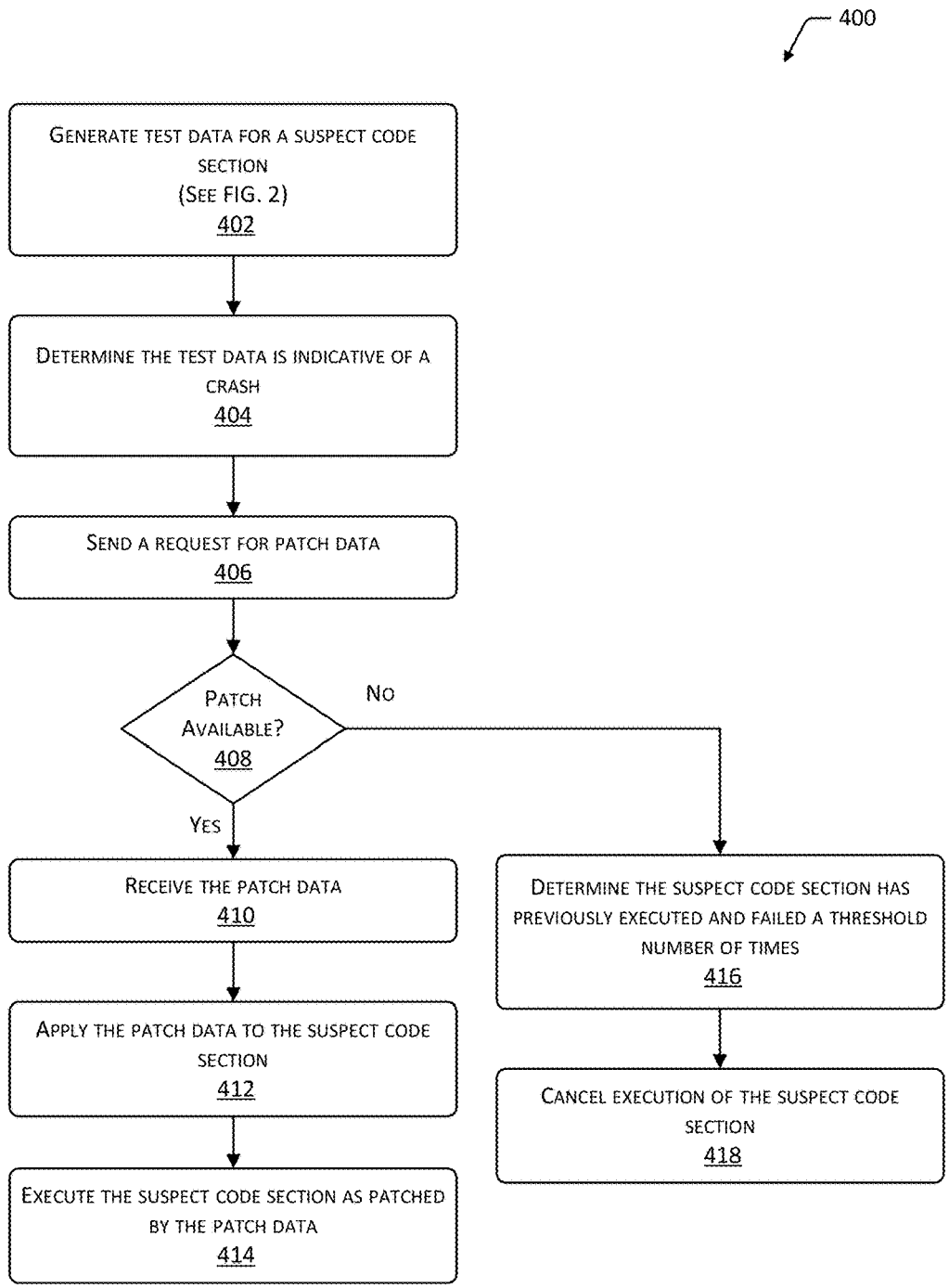
FIG. 4 is a flow diagram of a process for using the crash tolerant execution to patch faulty code, according to some implementations.

FIG. 4 is a flow diagram 400 of a process for using the crash tolerant execution to patch faulty code, according to some implementations. The process may be implemented at least in part by a patch module 326 executing at least in part on the computing device 102.

At 402 test data 128 for suspect code section 108 is generated. For example, the process described above with regard to FIG. 2 may be used to generate the test data 128.

At 404, the test data 128 is determined to be indicative of a crash or other failure. For example, the test data 128 may indicate that execution of the suspect code section 108 ceased and was unable to be completed during a predetermined period of time. In another example, the test data 128 may indicate that the execution of the suspect code section 108 resulted in invalid output.

At 406, a request is sent for patch data 328. For example, the code assessment module 118 may send the request via the network 334 to a server 336. The request may include information indicative of the suspect code section 108 that is currently being processed. The server 336 may respond to the request with patch data 328 that includes updates or corrections to at least a portion of the code section 106 that is part of the suspect code section 108.

At 408, if patch data 328 is available the process proceeds to 410.

At 410, the patch data 328 is received by the computing device 102.

At 412, the patch data 328 is applied to the suspect code section 108. For example, the suspect code section 108 executing within the suspect code execution environment 112 may be replaced with the patch data 328.

At 414, the suspect code section 108 as patched by the patch data 328 is executed. Continuing the example above, the now patched code section 106, or a portion thereof, is executed within the suspect code execution environment 112.

Returning to 408, if the patch data 328 is unavailable, the process proceeds to 416. At 416 a determination is made as to whether the suspect code section 108 has previously executed and failed a threshold number of times. For example, the threshold may be set to "2" and the suspect code section 108 may have been previously executed and generated test data 128 indicative of a failure twice previously on the computing device 102. Following prior test data 128 indicative of the failure, the suspect code data 120 or another data structure may be updated to include information indicative of the number of failures encountered. The threshold value may be manually set or dynamically adjusted.

At 418, execution of the suspect code section 108 is cancelled. This cancellation may be in one or more of the normal code execution environment 110 or the suspect code execution environment 112. For example, execution of the first code section 106(1) on the first hardware processor 114 may be cancelled, and a second code section 106(2) may then be executed.

In some implementations, other mechanisms for application of the patch data 328 be utilized. For example, the code assessment module 118 may determine the suspect code section 108 is to be executed within the normal code execution environment 110. At that point, the suspect code section 108 may be replaced or otherwise updated by the patch data 328, and the updated code may subsequently be processed within the normal code execution environment 110.

By using this process, relatively small changes to the application 104 may be made in an on-demand fashion allowing for ongoing improvement in the operation of the application 104 without the necessity for a wholesale reinstallation or upgrade of the entire application 104. This process thus allows for the improvement in the operation of the application 104 while minimizing network and computing resources that would otherwise be consumed during a wholesale reinstallation or upgrade. For example, the patch data 328 may be a few kilobytes in size, as compared to a complete update that may be many megabytes in size. As a result, the system allows for reduction in the use of bandwidth on the network 334. Additionally, the system described allows for the patching of code sections 106 that are actually used by the computing device 102. For example, a suspect code section 108 that is within a code section 106 that is never used may not be patched. As a result, unnecessary usage of network and computing resources is avoided.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a first hardware processor;
a second hardware processor;
one or more memories storing computer-executable instructions; and
the first hardware processor to execute the computer-executable instructions to:
access a first code section;
determine the first code section is suspect;
pause execution of the first code section;
determine first execution context data indicative of a state of the first hardware processor with respect to the first code section;
transfer the first execution context data to the second hardware processor;
the second hardware processor to execute the computer-executable instructions to:
receive the first execution context data;
execute the first code section using the first execution context data; and
generate test data indicative of execution of the first code section by the second hardware processor.

2. The system of claim 1, further comprising:
the second hardware processor to further execute the computer-executable instructions to:
determine the test data is indicative of a failure during execution of the first code section;
provide the test data to the first hardware processor;
the first hardware processor to further execute the computer-executable instructions to:
receive the test data;
cancel execution of the first code section; and
execute a second code section.

3. The system of claim 1, further comprising:
the second hardware processor to further execute the computer-executable instructions to:

generate second execution context data indicative of a state of the second hardware processor with respect to the first code section; and transfer the second execution context data to the first hardware processor; and the first hardware processor to further execute the computer-executable instructions to:

resume execution of the first code section using the second execution context data.

4. The system of claim 1, the instructions to determine the first code section is deemed suspect comprising instructions to:

access suspect code data comprising one or more previously stored stack backtraces that are indicative of stack frames associated with prior execution of suspect code;

determine execution state data indicative of one or more active stack frames associated with operation of the first hardware processor;

compare the execution state data to the suspect code data; and determine a match between the suspect code data and the execution state data.

5. A system comprising:

a first code execution environment (FCEE);

a second code execution environment (SCEE);

the FCEE configured to:

access a first code section;

determine at least a portion of the first code section is suspect;

determine first execution context data indicative of a state of the FCEE with respect to the first code section;

transfer the first execution context data to the SCEE;

the SCEE configured to:

receive the first execution context data;

execute the at least a portion of the first code section using the first execution context data; and generate test data.

6. The system of claim 5, further comprising:

the SCEE configured to:

determine a failure during execution of the first code section;

generate the test data that is indicative of the failure; and provide the test data to the FCEE;

the FCEE configured to:

receive the test data; and cancel execution of the first code section.

7. The system of claim 5, further comprising:

the SCEE configured to:

determine the test data is indicative of successful execution of the at least a portion of the first code section;

generate second execution context data indicative of a state of the SCEE with respect to the first code section; and transfer the second execution context data to the FCEE.

8. The system of claim 5, wherein the FCEE comprises a first hardware processor and the SCEE comprises a second hardware processor.

9. The system of claim 5, wherein the FCEE comprises a first hardware core of a first hardware processor and the SCEE comprises a second hardware core of the first hardware processor.

10. The system of claim 5, further comprising:

a communication interface; and the FCEE configured to:

receive suspect code data using the communication interface, wherein the suspect code data comprises data indicative of failures of particular portions of code as executed by other devices; and determine execution state data associated with the FCEE execution of the at least a portion of the first code section; and determine a correspondence between the suspect code data and the execution state data.

11. The system of claim 5, further comprising:

the FCEE configured to:

execute a second code section;

determine a failure of at least a portion of the second code section; and store, in a computer readable storage medium, suspect code data indicative of the at least a portion of the second code section.

12. The system of claim 5, further comprising:

the SCEE configured to:

execute the at least a portion of the first code section until one or more of:

a predetermined number of instructions;

a predetermined checkpoint in the first code section is reached; or a failure is determined.

13. The system of claim 5, wherein the FCEE is provided by a first computing device and the SCEE executes on a second computing device that is external to the first computing device, and further wherein communication between the FCEE and the SCEE is provided by one or more networks.

14. The system of claim 5, further comprising:

the SCEE configured to:

send the test data to an external device; and the FCEE configured to:

receive patch data comprising one or more revised instructions associated with the first code section; and execute at least a portion of the patch data.

15. A method comprising:

determining, at a first code execution environment (FCEE), a first code section scheduled for execution is deemed suspect;

pausing, at the FCEE, execution of the first code section;

determining, at the FCEE, first execution context data indicative of a state of the FCEE with respect to the first code section;

suspending, at the FCEE, execution of the first code section;

configuring a second code execution environment (SCEE) with the first execution context data; and executing, at the SCEE, the first code section.

16. The method of claim 15, further comprising:

determining the first code section has executed successfully a threshold number of times; and designating the first code section as non-suspect.

17. The method of claim 15, further comprising:

determining a patch for the first code section is unavailable;

determining the first code section has been previously executed and failed a threshold number of times;

cancelling, at the FCEE, execution of the first code section; and executing, at the FCEE, a second code section.

18. The method of claim 15, further comprising:
generating, at the SCEE, test data indicative of a failure of at least a portion of the first code section;
cancelling, at the FCEE, execution of the first code section; and
executing, at the FCEE, a second code section.

19. The method of claim 15, further comprising:
executing, at the SCEE, the first code section until one or more of:
 a predetermined number of instructions; or
 a predetermined checkpoint in the first code section is reached; or
 a failure is determined.

20. The method of claim 15, wherein the FCEE is provided by a first computing device and the SCEE executes on a second computing device that is external to the first computing device, and further wherein communication between the FCEE and the SCEE is provided by one or more networks.

* * * * *